(12) United States Patent
Galloway et al.

(10) Patent No.: US 7,406,476 B1
(45) Date of Patent: Jul. 29, 2008

(54) UPDATING A DATA STRUCTURE

(75) Inventors: Curtis Galloway, Santa Cruz, CA (US);
James L. Mensch, San Jose, CA (US)

(73) Assignee: Apple Inc., Cupertino, CA (US)

( * ) Notice: Subject to any disclaimer, the term of this patent is extended or adjusted under 35 U.S.C. 154(b) by 390 days.

(21) Appl. No.: 11/097,216

(22) Filed: Apr. 4, 2005

(51) Int. Cl.
*G06F 15/16* (2006.01)

(52) U.S. Cl. .................................................. 707/101

(58) Field of Classification Search ................ 707/101; 709/201, 213
See application file for complete search history.

(56) References Cited

U.S. PATENT DOCUMENTS

| | | | | |
|---|---|---|---|---|
| 5,530,948 | A | * | 6/1996 | Islam ............................. 714/6 |
| 5,535,365 | A | * | 7/1996 | Barriuso et al. ............. 711/155 |
| 5,625,819 | A | * | 4/1997 | Hoffer, Jr. .................... 707/202 |
| 5,987,506 | A | * | 11/1999 | Carter et al. ................. 709/213 |
| 6,480,918 | B1 | * | 11/2002 | McKenney et al. ......... 710/200 |
| 6,502,170 | B2 | * | 12/2002 | Zahir ........................... 711/141 |
| 6,868,414 | B2 | * | 3/2005 | Khanna et al. .................. 707/3 |
| 2006/0031844 | A1 | * | 2/2006 | Dice et al. ................... 718/106 |

* cited by examiner

*Primary Examiner*—Chong H Kim
(74) *Attorney, Agent, or Firm*—Fish & Richardson P.C.

(57) ABSTRACT

An implementation repeatedly updates data in a data structure, the data structure having a size larger than an atomic size. The implementation avoids locking the data structure on every update, however. One method accesses data in a first portion of a data structure and estimates, based on the accessed data, an impact on data in a second portion of the data structure arising from an update to data in the first portion. The method then determines, based on the estimated impact, whether to lock the data structure during an update to data in the data structure. In a more particular example, a counter is copied on a regular basis. If only the least significant bits of the counter have changed, then an atomic instruction is used to copy only the least significant bits. However, when the more significant bits have changed, a lock is used to copy the entire counter.

30 Claims, 6 Drawing Sheets

UPDATING A DATA STRUCTURE

TECHNICAL FIELD

This disclosure relates to data processing.

BACKGROUND

A data structure may be used to store data. If the data that is to be stored is changing, then the data structure may be updated according to a schedule to reflect the new values of the changing data. During such an update, it may be desirable to perform the entire update without allowing another process to access the data structure (for example, at a point in time at which a portion of the data structure has been updated, but another portion of the data structure has not been updated). Such mid-update access may be prevented by locking the data structure or by updating the data structure using an atomic operation.

SUMMARY

Various data structures cannot be updated using an atomic operation, and locking a data structure during every update may be undesirable for performance reasons. A disclosed implementation describes a method for updating a data structure that cannot be updated in its entirety using an atomic operation, and the method allows the data structure to be updated without taking a lock during every update. The implementation leverages a known relationship between various portions of the data structure to determine if (i) only a small portion of the data structure needs to be updated, in which case an atomic operation is used, or (ii) if a larger portion of the data structure needs to be updated, in which case a lock is taken.

According to one general aspect, data in a first portion of a data structure is accessed and, based on the data accessed from the first portion, an impact is estimated, the impact being to data in a second portion of the data structure arising from an update to data in the first portion. Based on the estimated impact, it is determined whether to lock the data structure during an update to data in the data structure.

Implementations of the above general aspect may include one or more of the following features. For example, determining whether to lock may include determining not to lock. Source data may be accessed, and the data in the first portion of the data structure may be updated with the accessed source data. Updating the data in the first portion may be performed using an atomic instruction that updates the data in the first portion atomically. Before updating, it may be determined that the data in the first portion of the data structure has not changed since the impact was estimated. A single atomic instruction may be used both to determine that the data has not changed and to update the data.

Determining whether to lock the data structure may include determining to lock the data structure. Source data may be accessed, and the data in the first portion of the data structure may be updated with the accessed source data. An impact may be determined, the impact being an impact on the data in the second portion of the data structure arising from the updating of the data in the first portion of the data structure. The data in the second portion of the data structure may be updated based on the determined impact. The data structure may be locked before updating the data in the first portion of the data structure, and the data structure may be unlocked after updating the data in the second portion of the data structure.

A size of the source data may be the same as, or less than, a size of the first portion of the data structure. A size of the data structure may be greater than an atomic size.

The data structure may be a counter and the estimated impact may include a roll-over from less significant bits of the counter to more significant bits of the counter. Estimating the impact may include estimating that there will be no impact on the data in the second portion.

According to another general aspect, data is retrieved from a first element of a data structure. Based on the data retrieved from the first element, an assessment is made as to whether an update to data in the first element might necessitate an update to data in a second element of the data structure. Based on the assessment, a decision is made as to whether to lock the data structure during an update to data in the data structure.

Implementations of the above general aspect may include one or more of the following features. For example, source data may be accessed, and the data in the first element of the data structure may be updated with the accessed source data. It may be determined, before the updating, that the data in the first element of the data structure has not changed since the assessment was performed. A single atomic instruction may be used both to determine that the data has not changed and to update the data. A size of the data structure may be greater than an atomic size. Making the assessment may include assessing that no update to data in the second element will be necessitated. Making the decision of whether to lock may include deciding not to lock the data structure.

According to another general aspect, a device includes a mechanism for receiving data from a first portion of a data structure. The device also includes a mechanism for determining, based on data received from the first portion, whether an update to data in the first portion might cause a change to data in a second portion of the data structure. The device further includes a mechanism for determining, based on a result of determining whether an update to data in the first portion might cause a change to data in a second portion, whether to lock the data structure during an update to data in the data structure.

According to another general aspect, data is accessed in a low-order portion of a target counter, the target counter also including a high-order portion. Based on the data accessed from the low-order portion, it is estimated whether an update to the low-order portion could cause a roll-over of the low-order portion into the high-order portion. Based on the roll-over estimation, it is determined whether to lock the target counter during an update to data in the target counter.

Implementations of the above general aspect may include one or more of the following features. For example, estimating may include estimating that an update to the low-order portion could not cause a roll-over, and determining whether to lock the target counter may include determining not to lock the target counter. Data may be accessed from a source counter, the source counter having a size that is smaller than a size of the target counter, and the low-order portion of the target counter may be updated with the data accessed from the source counter. It may be determined, before the updating, that the data in the low-order portion of the target counter has not changed since the estimating was performed. A single atomic instruction may be used both to determine that the data has not changed and to update the low-order portion. Accessing the data in the low-order portion of the target counter, estimating whether the update could cause a roll-over, and determining whether to lock may be performed repeatedly in response to a timed event.

According to another general aspect, data is received in a low-order portion of a target counter, the target counter also including a high-order portion. It is determined, based on the data received from the low-order portion, that an update to the low-order portion could not cause a roll-over of the low-order portion into the high-order portion. It is decided, based on the no-roll-over determination, not to lock the target counter during an update to data in the target counter. Data is accessed from a source counter, the source counter having a size that is smaller than a size of the target counter. It is determined that the data in the low-order portion of the target counter has not changed since the no roll-over determination. After determining that the data in the low-order portion has not changed, the low-order portion of the target counter is updated with the data accessed from the source counter. Determining that the data has not changed and updating the low-order portion are performed using a single atomic instruction.

According to another general aspect, data is accessed in a first portion of a source data structure. It is determined, based on the data accessed from the first portion of the source data structure, whether data in a second portion of the source data structure may have changed since a previous access of the data in the first portion of the source data structure. It is determined, based on the determination of whether the data in the second portion has changed, whether to lock a target data structure while storing all or part of data from the source data structure into the target data structure.

Implementations of the above general aspect may include one or more of the following features. For example, determining whether data in a second portion has changed may include comparing the data accessed from the first portion to one or more stored values. The one or more stored values may be used to differentiate data in the first portion that has no supporting data stored in the second portion, from data in the first portion that does have supporting data stored in the second portion. Determining whether data in a second portion has changed may further include determining whether data in the second portion has changed based on a result of the comparing.

Determining whether data in a second portion has changed may include determining that data in the second portion has changed. The data in the first portion of the source data structure may be stored into a first portion of the target data structure. The data in the second portion of the source data structure may be stored into a second portion of the target data structure.

The target data structure may include a first portion and a second portion. A combined size of the first portion of the target data structure and the second portion of the target data structure may exceed an atomic size. A size of the first portion of the target data structure might not exceed the atomic size.

The above general aspects may be implemented, for example, using a method and an apparatus. An apparatus may include one or more computer readable media having instructions stored thereon and configured to result in one or more of the general aspects being performed. An apparatus may include one or more pieces of structure for performing operations in one or more of the general aspects. A method may include the operations that are performed, or the operations that structure is configured to perform, in one or more of the general aspects.

Various disclosed implementations allow a data structure to be updated quickly, while also providing some assurance of the integrity of the data stored into the data structure. Several such implementations allow updates to be performed for data structures that are larger than an atomic size without needing to lock the data structure during every update. Using these larger data structures and the disclosed updated techniques enables a variety of applications, such as high quality audio playback that may require access to large counter values (or other data structures) without excessive delay for updates.

The details of one or more implementations are set forth in the accompanying drawings and the description below. Other features will be apparent from the description and drawings, and from the claims.

DETAILED DESCRIPTION

A method and architecture for updating a data structure are provided. In one implementation, the data structure is a software counter stored in non-volatile memory. Alternatively, the data structure may be of the form of, for example, a register or a buffer. The software counter is updated periodically to mirror a hardware counter that is incremented in real-time as particular events occur. The software counter is checked at the beginning of the update process to determine if an update to the software counter value will only change a first portion of the software counter (for example, the least significant bits), or if the update will also change a second portion of the software counter (for example, the most significant bits). If the change is confined to the first portion of the software counter, then an atomic operation is used for the update, and only the first portion is updated. If the change extends to the second portion of the software counter, then a lock is taken on the software counter in order to perform the update, and both the first portion and the second portion are updated. Because the updates to the software counter occur frequently, most of the updates only involve a change to the first portion of the software counter and do not require taking a lock.

We now describe a specific implementation, and we include a description of a significant number of details to provide clarity in the description. The specific implementation involves a hardware counter used in a Universal Serial Bus controller, and an associated software counter that is updated with values from the hardware counter. In this specific implementation, the hardware counter has a size of 11 bits, and the software counter has a size of 64 bits. However, as one of ordinary skill in the art appreciates, and as we discuss in this document after presenting the specific implementation, the sizes of the counters may be varied and, further, other data structures may be used in lieu of or in addition to counters. In addition to using other data structures, other implementations also may involve different relationships between the data in the data structure, as is also discussed after presenting the specific implementation below.

Figure 1:
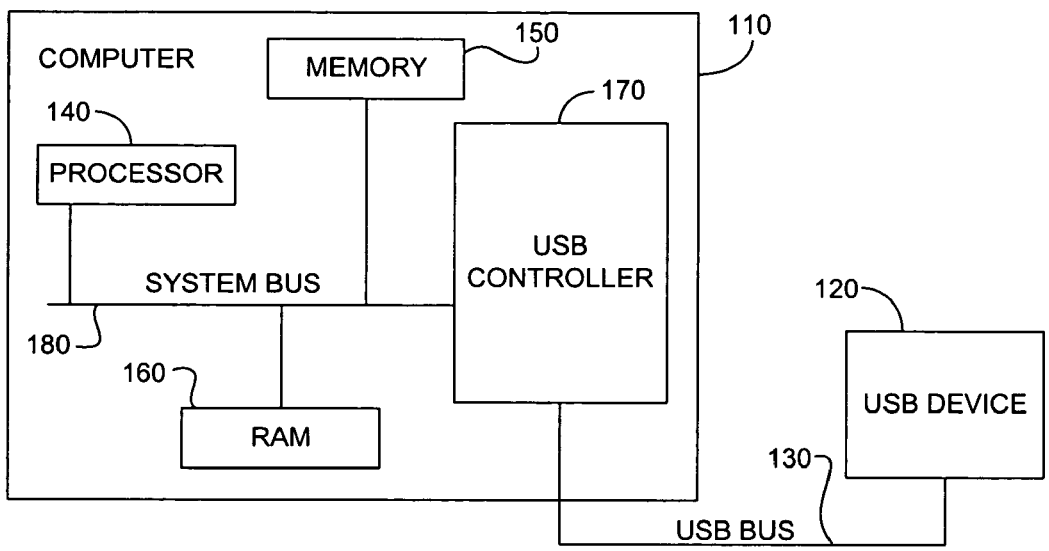
FIG. 1 is a block diagram showing various hardware components in a computer system.

Referring to FIG. 1, a computer system 100 includes a computer 110 communicatively coupled to a Universal Serial Bus ("USB") device 120 over a USB bus 130. Computer 110 includes a processor 140, a non-volatile memory 150 referred to as "memory" 150, a volatile memory 160 referred to as a random access memory ("RAM") 160, and a USB controller 170, all communicatively coupled to a system bus 180. USB controller 170 is configured to control USB device 120.

Figure 2:
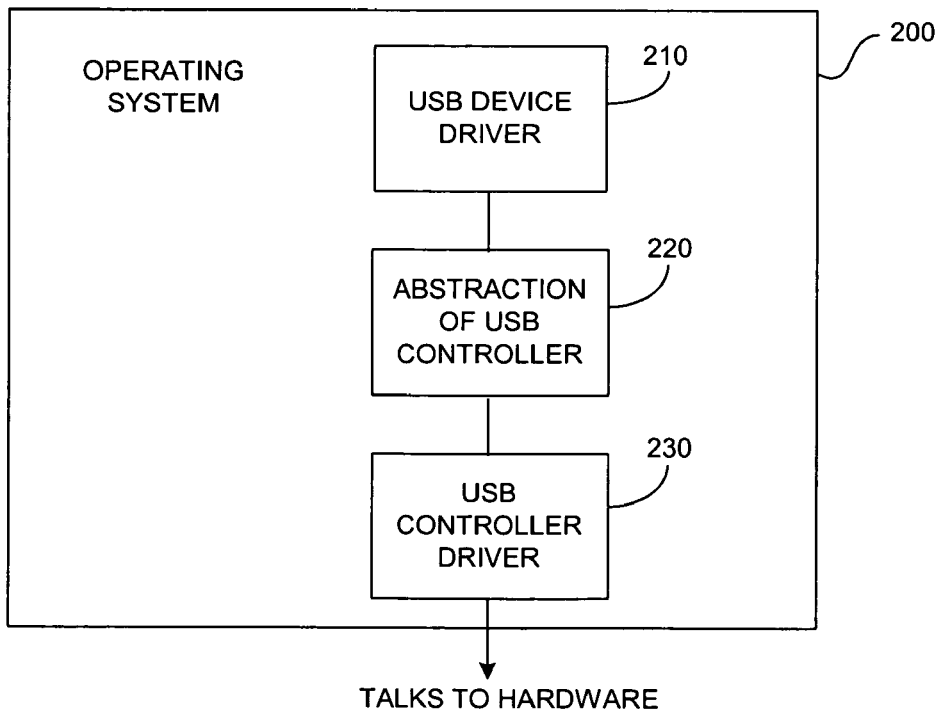
FIG. 2 is a block diagram showing various software components in the computer system of FIG. 1.

Referring to FIG. 2, an operating system 200, such as, for example, MAC OS X from Apple Computer, Inc. of Cupertino, Calif., runs on processor 140. Operating system 200 includes a USB device driver 210 that is configured to provide a software interface to USB device 120, an abstraction 220 of USB controller 170, and a USB controller driver 230 that provides a software interface to USB controller 170. USB device driver 210 is communicatively coupled to abstraction 220, and abstraction 220 is further communicatively coupled to USB controller driver 230. Additionally, USB controller driver 230 is communicatively coupled to USB controller 170. Drivers 210 and 230 can be loaded into a kernel (not shown) of operating system 200, but other implementations may use drivers that are separate from the operating system.

Figure 3:
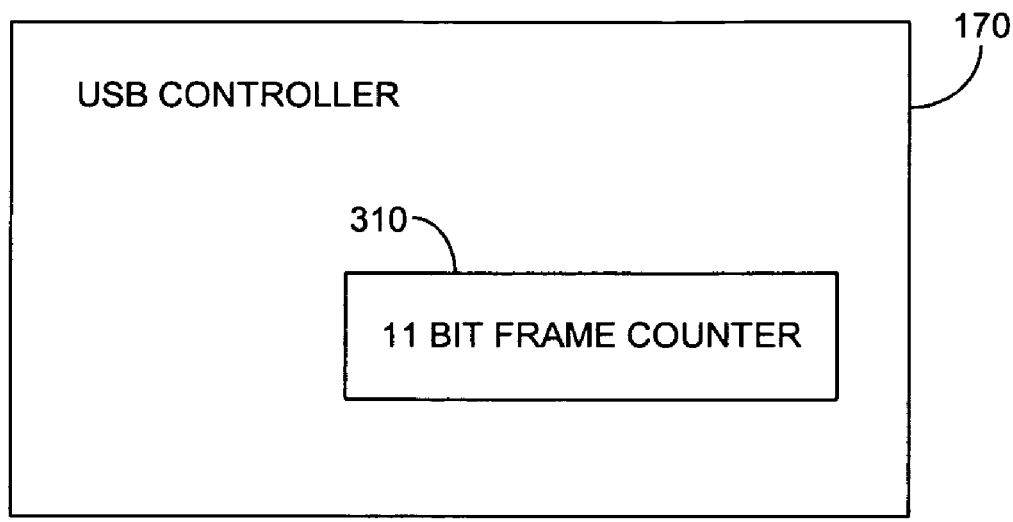
FIG. 3 is a block diagram showing a register of a Universal Serial Bus Controller of FIG. 1.
Figure 4:
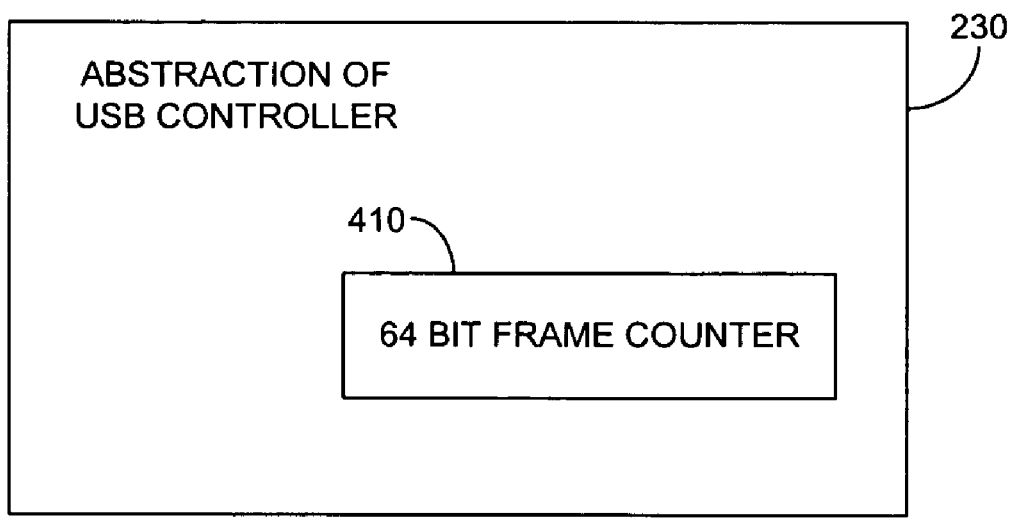
FIG. 4 is a block diagram showing a register of a software abstraction, of the Universal Serial Bus Controller, of FIG. 2.

Referring to FIGS. 3 and 4, USB controller 170 includes an 11-bit hardware frame counter 310 that counts from zero to 2047 and then rolls over back to zero again. Abstraction 220 includes a 64-bit software frame counter 410. Counters 310 and 410, and computer system 100 more generally, provide a general framework for a USB system. USB systems typically coordinate communications and events based on a USB frame count that is stored in counter 310 of USB controller 170. Abstraction 220 stores a copy of the USB frame count in counter 410, and updates counter 410 periodically to reflect a current value of the USB frame count from counter 310. By storing a copy of the USB frame count in counter 410, abstraction 220 provides a uniform interface for various USB controller drivers to access the USB frame count. This allows the details of communicating with different vendors' USB controllers to be handled at the level of abstraction 220.

Additionally, software counter 410 is a 64-bit counter whereas hardware counter 310 is an 11-bit counter. Accordingly, application programs running on processor 140 are provided with a significantly larger range of USB frame count values to use. This allows, for example, an audio program running on processor 140 to schedule audio samples to be played at USB frame counts that are more than 2048 ($2^{11}$) USB frame counts in the future. In implementations having a USB frame length of 1 millisecond, the 2048 frame counts only provide for approximately two seconds of advance scheduling. A 64-bit counter provides additional flexibility and robustness for applications.

In the above audio example, USB device 120 may be a set of speakers and the audio program can synchronize with the speakers to schedule samples of audio to be sent to the speakers at particular USB frame counts in the future. The synchronization may include a speaker driver (USB device driver 210) communicating with abstraction 220 which in turn asks USB controller driver 230 for a value of counter 410. Upon receiving the request for the value of counter 410, USB controller driver 230 accesses the new USB frame count in counter 310 and the new USB frame count is passed through abstraction 220 on to the speaker driver (USB device driver 210) and the audio program.

In addition to updating counter 410 upon a request for the value of counter 410, abstraction 220 also can update counter 410 in response to a timed event. Specifically, abstraction 220 can poll counter 310 at regular intervals to ensure that an update occurs before the USB frame count in counter 310 rolls over. Otherwise, counter 410 may not obtain an accurate reading of the USB frame count. In an implementation having a 1 millisecond USB frame length, counter 310 will roll over every 2048 milliseconds. Accordingly, abstraction 220 may poll counter 310, for example, once per second to build in a margin of safety. Other implementations may, for example, receive interrupts when the frame count rolls over, such as are available from USB controllers that conform to the "Open Host Controller Interface" specification. However, certain USB controllers, such as, for example, USB controllers that conform to the "Universal Host Controller Interface" specification, do not provide roll-over interrupts.

Figure 5:
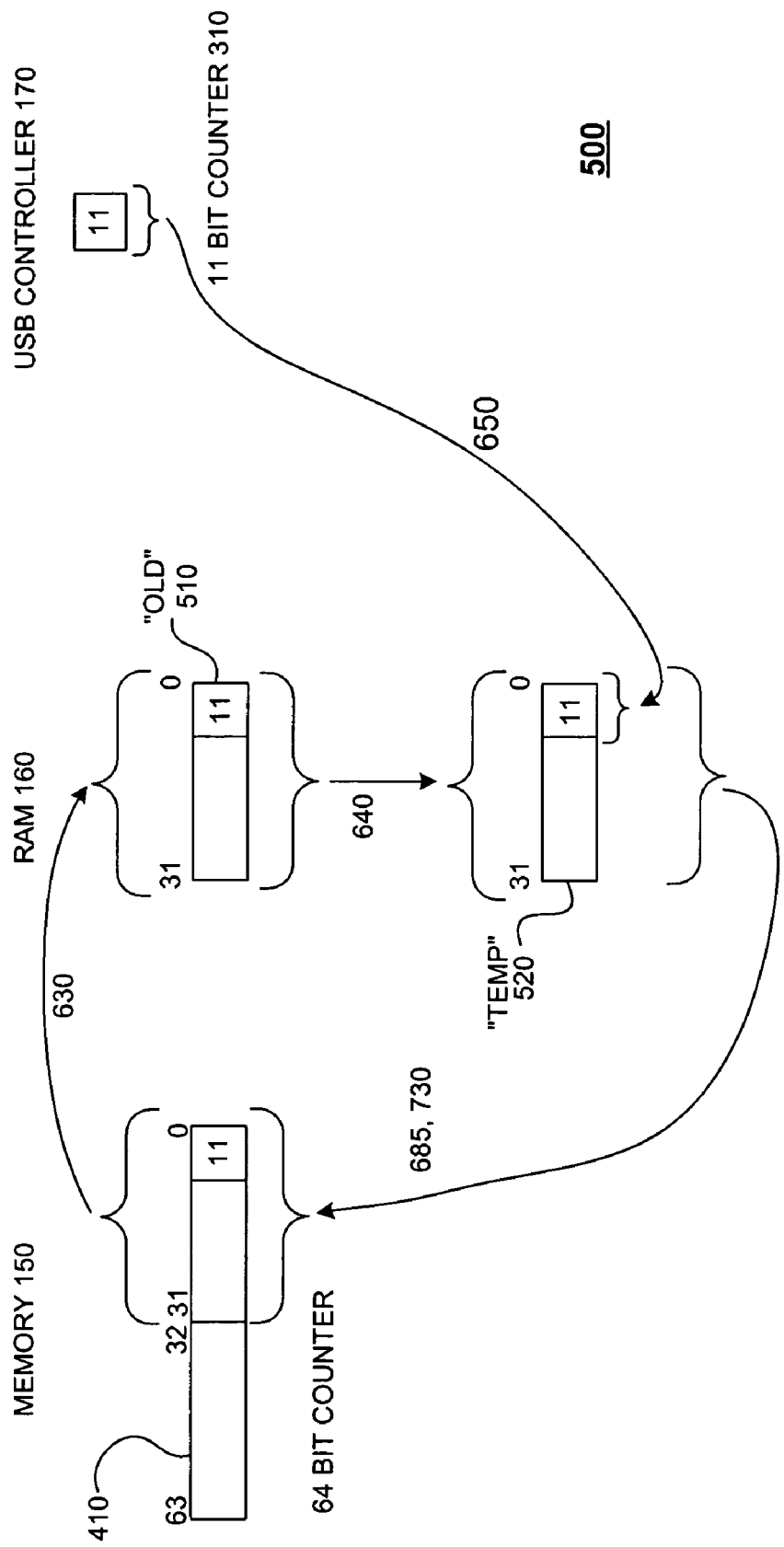
FIG. 5 is an architecture showing various registers, including the registers of FIGS. 3 and 4, and including flow annotations showing the movement of certain information among the registers during an update process.

Referring to FIG. 5, an architecture 500 is used in updating counter 410 to reflect a current value of counter 310. Counter 410 is stored in memory 150, and is accessible by multiple threads of control. Other implementations may store counter 410 in RAM 160. RAM 160 is used by abstraction 220 to store two registers each time that abstraction 220 is called to provide a current value of counter 410 and each time abstraction 220 performs a periodic poll of USB controller 170 to update counter 410. In one implementation, the two registers are stored on a given thread's stack and are not accessible by other threads. The first register is a register 510 labeled "old" that is used, for example, to store a least significant half of the old value of counter 410. The second register is a register 520 labeled "temp" that is used, for example, to store the new USB frame count in the least significant 11 bits of "temp." Other implementations may use locations in memory 150 in addition to or in lieu of RAM 160 to receive all or part of counter 410. Still other implementations may use hardware logic, such as, for example, integrated circuits configured as, for example, counters, flip-flops, and shift registers, to receive all or part of counter 410.

Architecture 500 is a 32-bit architecture, and processor 140 provides 32-bit instructions. In an implementation, one of the 32-bit instructions is an atomic instruction that can be used to update a 32-bit memory location. An atomic instruction is an instruction that executes to completion without interruption. That is, there is no chance of the instruction being half-completed or of another instruction being interspersed. The 32-bit atomic update instruction may be, for example, a "compare and swap" instruction that allows a first location and a second location to be compared and, based on a result of the comparison, the first location is (or is not) stored into a third location. Both the "compare" part and the "swap" part of the instruction are performed without any other instruction being performed in between the "compare" and the "swap." In light of the availability of an atomic update instruction for 32-bit memory locations, registers 510 and 520 are configured as 32-bit registers and counter 410 consists of two 32-bit halves.

In the implementation being described, no 64-bit atomic update instruction is available. As a result, an update to counter 410 would require two atomic instructions, a first to update bits 0-31 and a second to update bits 32-63. This may leave open the possibility that another process might access counter 410 when only bits 0-31, for example, were updated. Such an event might occur, for example, if two software audio applications called abstraction 220 at about the same time, setting off two threads of control of abstraction 220, each of which attempts to update counter 410. For example, a software audio playback application accessing a USB speaker might call for the value of counter 410 at about the same time that a software audio capture application accessing a USB microphone calls for the value of counter 410. The two threads of control of abstraction 220 may be operating on a single processor, for example, and the second thread might interrupt the first thread and update the entirety of counter 410 in between the first thread's update to bits 0-31 of counter 410 and the first thread's update to bits 32-63 of counter 410.

As described above, to avoid such interspersed access to counter 410, each thread of control of abstraction 220 could lock counter 410 before accessing counter 410. However, locking a resource may take a significant amount of time to implement, and may introduce significant delays in those processes attempting to access the USB frame count. Further, the delays may degrade a user's experience in other ways, such as by interrupting audio playback over USB speakers.

In the above implementation, however, it is not necessary to take a lock on counter 410 for every update. A change to bits 32-63 of counter 410 is rare. Specifically, bits 32-63 of counter 410 only get changed once every $2^{32}$ frame counts, which corresponds to once every $2^{32}$ milliseconds (or approximately once every fifty days). In addition to knowing the frequency, the exact point in time of this rare update is tracked by monitoring bits 0-31 to determine when a roll-over of bit 31 may occur. As a result, rather than locking counter 410 during every update, the implementation may only need to lock counter 410 once every fifty days when bit 31 is going to roll-over (also referred to as an overflow).

Figure 6:
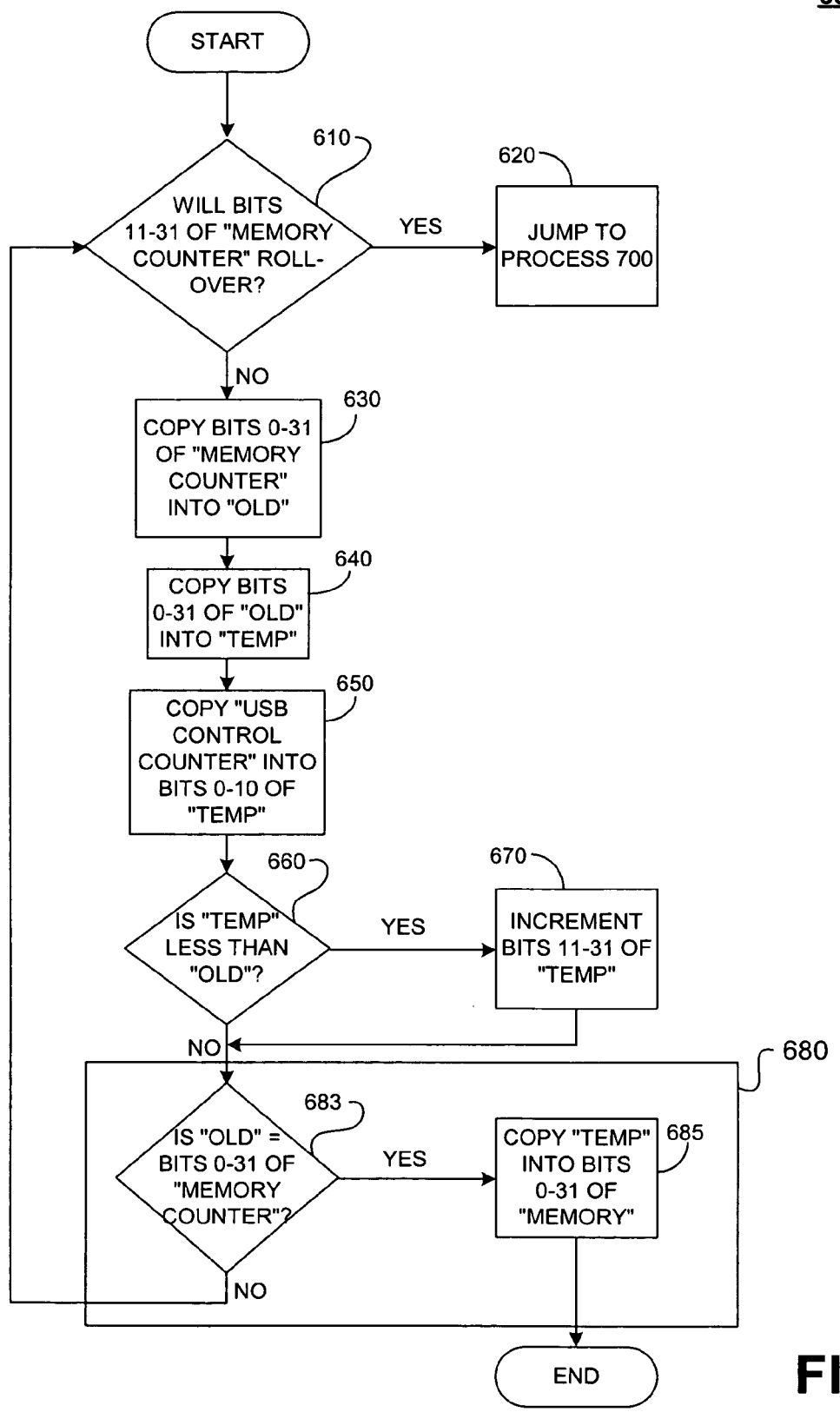
FIG. 6 is a flow chart showing a first process for updating the register of FIG. 4.
Figure 7:
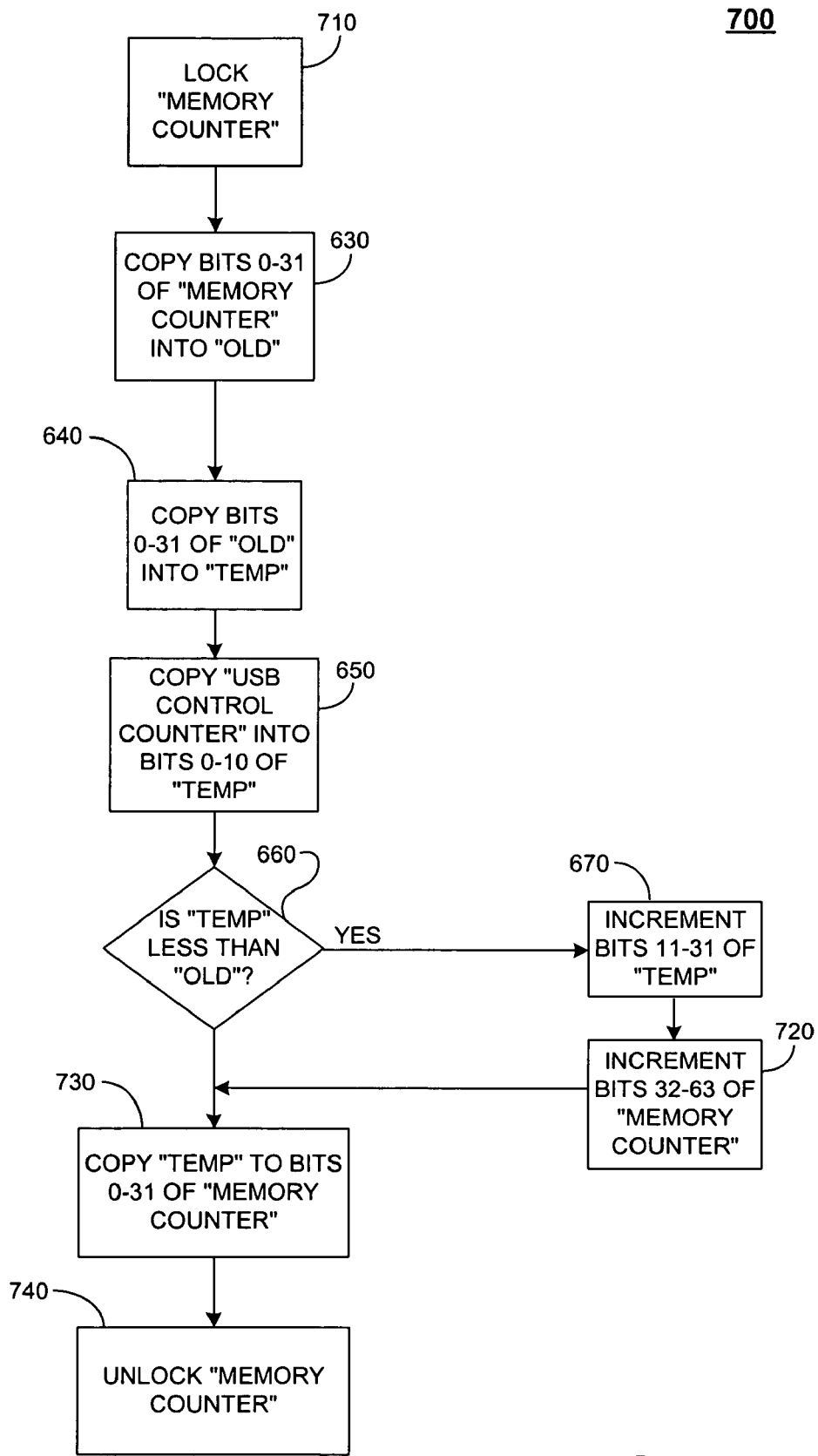
FIG. 7 is a flow chart showing a second process for updating the register of FIG. 4.

Referring to FIGS. 6 and 7, a process 600 and a process 700 are used to update counter 410 using architecture 500. Each update of counter 410 begins with process 600 to determine whether a lock is recommended, and then either continues with process 600 (if no lock is needed) or branches to process 700 (if a lock is needed).

Process 600 begins by determining whether bits 11-31 of counter 410 could roll-over when counter 410 is updated (610). If such a roll-over could occur ("yes" branch from operation 610), then process 600 jumps to process 700 to update the entire counter 410 (620). Else, if such a roll-over could not occur ("no" branch from operation 610), then process 600 proceeds to update only the lower half of counter 410. Implementations may determine whether bits 11-31 of counter 410 could roll-over by, for example, determining whether bits 11-31 are all ones. If bits 11-31 are all ones, then a roll-over of bits 0-10 would create a roll-over of bits 11-31. Other implementations may use other mechanisms to determine whether bits 11-31 of counter 410 could roll-over and may, for example, build in a margin of safety. For example, an implementation may determine whether bits 11-30 are all ones or whether bits 12-31 are all ones.

The update of the lower half continues by copying bits 0-31 of counter 410 into "old" register 510 (630), and copying bits 0-31 of "old" register 510 into "temp" register 520 (640). Counter 410 presumably contains an old value of counter 310, and this old value is copied into both of the temporary registers 510 and 520 in operations 630 and 640, respectively. Operations 630 and 640 are shown graphically in FIG. 5 with arrows.

Process 600 continues by copying a current value of counter 310 into bits 0-10 of "temp" register 520 (650). Operation 650 is shown graphically in FIG. 5 with arrows. Process 600 then determines whether the value in "temp" register 520 is less than the value in "old" register 510 (660). The determination in operation 660 indicates whether or not counter 310 has rolled over since the previous update. Specifically, if the value in "temp" register 520 is less than the value in "old" register 510, then a roll-over has occurred in counter 310 since the previous update of counter 410. This follows because the current value of counter 310 that was stored into bits 0-10 of "temp" register 520 is lower than the old value of counter 310 which was presumably stored into counter 410 on an earlier update and then copied to bits 0-10 of "old" register 510 in operation 630. Implementations may determine if the value in "temp" register 520 is less than the value in "old" register 510 by, for example, comparing the values or subtracting the values and comparing the difference to zero.

If the value in "temp" register 520 is less than the value in "old" register 510 ("yes" branch from operation 660), revealing a roll-over of counter 310, then bits 11-31 of "temp" register 520 are incremented by one (670). After the increment of bits 11-31 of "temp" register 520 in operation 670, or if the value in "temp" register 520 was not less than the value in "old" register 510 ("no" branch from operation 660), process 600 proceeds to update, if possible, the lower half of counter 410 (680). More specifically, process 600 determines whether the value in "old" register 510 is equal to the value in bits 0-31 of counter 410 (683). If the value in "old" register 510 is equal to the value in "old" register 510 ("yes" branch from operation 683), then the value in "temp" register 520 is copied into bits 0-31 of counter 410 (685). Else, if the value in "old" register 510 is not equal to the value in bits 0-31 of counter 410 ("no" branch from operation 683), then process 600 jumps back to operation 610 to start over. Operation 685 is shown graphically in FIG. 5 with an arrow.

Process 600 starts over ("no" branch from operation 683) because the determination that the value in "old" register 510 is not equal to the value in bits 0-31 of counter 410 indicates that the lower portion of counter 410 has been changed since process 600 copied bits 0-31 in operation 630. In such an event, as a precaution, and to help ensure the integrity of counter 410, process 600 starts over. To further help to ensure the integrity of counter 410, operations 683 and 685 are performed with a single atomic instruction, such as, for example, a compare-swap instruction. The use of an atomic instruction prevents another process from changing bits 0-31 of counter 410 between the compare operation 683 and the swap (copy) operation 685. Other implementations need not necessarily start over if bits 0-31 of counter 410 have been changed ("no" branch of operation 683), however, because the data to be copied into bits 0-31 of counter 410 may be considered more reliable data.

To further help to ensure the integrity of counter 410, other implementations may perform operation 630 before operation 610. This reordering provides additional assurances that another process did not update counter 410 after the no-roll-over decision of operation 610.

Referring again to FIG. 7, process 700 is called by operation 620 of process 600 after operation 610 of process 600 determines that bits 0-31 of counter 410 could roll-over when counter 410 is updated. Process 700 begins by locking counter 410, which locks bits 0-63. This lock prevents any other process from accessing counter 410 during process 700.

Process 700 continues by performing operations 630 through 660. If the value in "temp" register 520 is less than the value in "old" register 510 ("yes" branch of operation 660), then a roll-over occurred in counter 310 and process 700 increments bits 11-31 of "temp" register 520 (670). Incrementing bits 11-31 of "temp" register 520 creates a roll-over, however, as determined in operation 610, so process 700 also increments bits 32-63 of counter 410 to reflect the roll-over (680).

Process 700 continues, after incrementing bits 32-63 of counter 410 (720) or determining that no roll-over occurred in counter 310 (660), by copying the value in "temp" register 520 to bits 0-31 of counter 410 (730). No compare operation is needed in process 700 before copying to memory (730) because a lock has been taken, so process 700 is certain that counter 410 has not been changed since the lock occurred (710). Operation 730 is shown graphically in FIG. 5, along with operation 685, with an arrow.

Other implementations may provide additional assurances of the integrity of data in counter 410 by verifying that counter 410 did not change between determining that a roll-over into bits 32-63 could occur (610) and taking a lock (710). For example, operation 610 could be repeated immediately after operation 710.

After operation 730, counter 410 now has a fully updated value, and process 700 unlocks counter 410 (740). The lock of process 700 prevents another process from accessing counter 410 during the update to counter 410. In particular, because all sixty-four bits of counter 410 cannot be updated in a single atomic instruction, if process 700 did not lock counter 410, then it may be possible for another process to access counter 410 in between operations 720 and 730, that is, in between the update of bits 0-31 of counter 410 (720) and the update of bits 32-63 of counter 410 (730). Locking counter 410 prevents such a mid-update access and helps to ensure the integrity of the data in counter 410 after process 700 finishes updating counter 410.

In an implementation described earlier, counter 310 is polled once per second and counter 310 is expected to roll-over once approximately every two seconds. In such an implementation, approximately every other polled update may be expected to reveal a roll-over of counter 310. Accordingly, operation 610 would typically be expected to recommend a lock (when bits 11-31 of counter 410 are all ones) for two successive polled updates, but only half of these locks will be expected to be necessary. However, this represents an expected locking frequency of approximately only two locks at the end of every 50 days. Such a locking frequency may compare favorably with an alternative of locking for every update, which would occur approximately once per second for polled updates, and which could occur even more frequently due to updates requested when an application asks for the value of counter 410.

Implementations may vary various parameters, such as, for example, the size of counter 310, and the polling or update frequency. Additionally, implementations need not ensure that all roll-overs are identified if, for example, applications can tolerate a missed roll-over or can estimate when a roll-over has occurred rather than identifying when a roll-over has occurred.

Implementations also may extend processes 600 and 700 to applications that update a data structure other than a counter. For example, processes 600 and 700 may generally be extended to a data structure having a first portion that varies in a predictable manner based on a second portion. In one implementation, the first portion may vary randomly, but the second portion may vary in a predictable manner depending on the value of the first portion. For example, a data structure may be used to store weather information, and a first portion of the data structure may be used to store basic information such as temperature, barometric pressure, and wind speed and direction. A second portion may be used, however, to store additional information only when the first portion indicates a rapidly changing set of data. Thus, by examining the stored values for the first portion and the new values for the first portion, an implementation may determine whether or not those values are changing rapidly and, therefore, whether or not the second portion needs to be updated. Further implementations may store data into the second portion only when an unexpected set of values for the first portion occur, and these implementations need only examine the new values for the first portion to determine whether to update the second portion.

Regardless of the size of the first and second portions above, savings in processing time will typically be realized. If, however, the first portion can be updated with an atomic instruction, and the entire data structure cannot be updated with an atomic instruction, then the implementations can avoid taking a lock on the data structure for some percentage of the updates. In such cases, the first portion can be said to have a size that is less than or equal to an atomic size because the first portion can be updated with an atomic instruction.

Processes 600 and 700 can be extended to applications in which the data structure is the same size, or even smaller, than the data element that is being mirrored. Continuing with the above example, the data structure may only be copying/storing a few of the weather parameters available.

Figure 8:
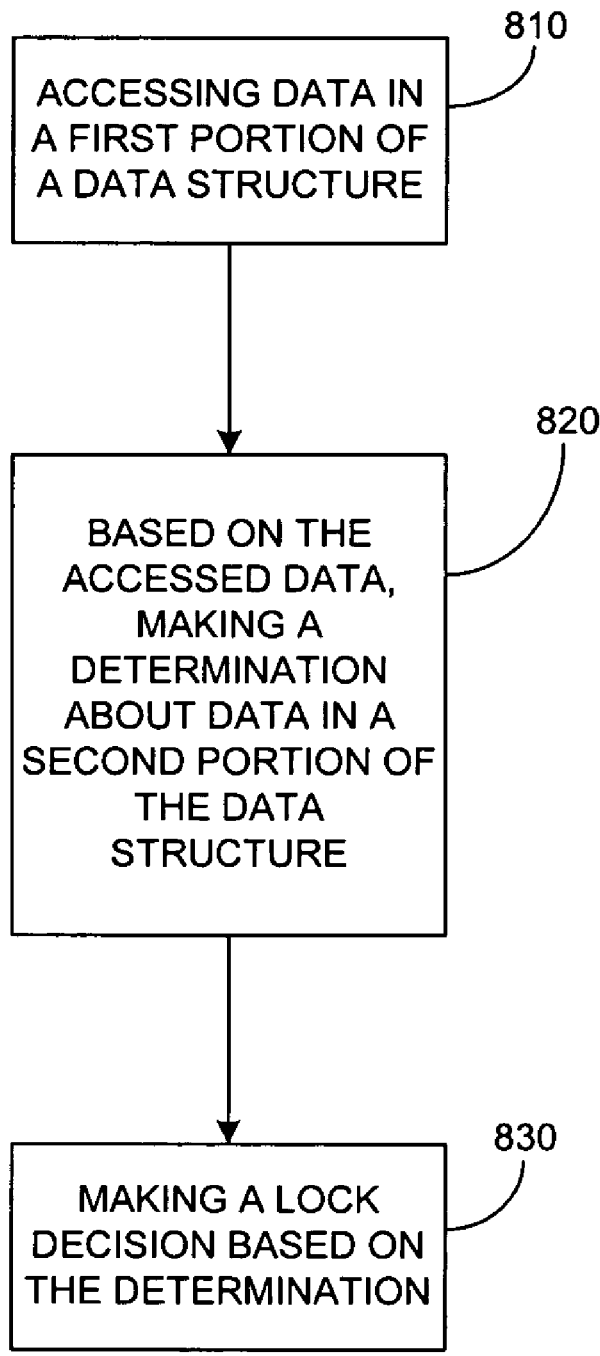
FIG. 8 is a flow chart showing a process for making a lock decision.

Referring to FIG. 8, a process 800 describes another implementation that may be used with various different data structures and with various different relationships among data stored within the data structures. Process 800 includes accessing data in a first portion of a data structure (810). For example, bits 0-31 of counter 410 may be accessed, or the basic weather information described above may be accessed. Process 800 also includes making a determination about data in a second portion of the data structure based on the data accessed in the first portion (820). For example, based on the value of bits 0-31 of counter 410, a determination may be made regarding whether bits 32-63 of counter 410 might roll-over when counter 410 is updated. As another example, based on the basic weather information, a determination may be made regarding whether the additional weather information has been updated since the last access. Process 800 also includes making a lock decision based on the determination in operation 820 (830). For example, if the determination is that bits 32-63 of counter 410 might roll-over during an update of counter 410, then a decision may be made to lock counter 410 during the update. As another example, if the determination is that the additional weather information has changed since the last access of the additional weather information, then a decision may be made to lock a target data structure while both the basic and additional weather information are copied to the target data structure.

The implementations described may be extended by using various mechanisms for enforcing limits on access to a resource in an environment where there are many threads of execution. Locks, however, are one mechanism of enforcing such limits. Other mechanisms include various concurrency control techniques and serialization techniques, including, for example, timestamp-based concurrency control. The term "locking" is used to refer generally to mechanisms that enforce exclusive access to a resource, for more than an atomic instruction, by one thread of program control.

Computer system 100 may represent a variety of different types of computer systems, each having a variety of different components, such as, for example, a mainframe computer system, a personal computer, and a personal digital assistant ("PDA"). Computer 110 refers generally to a computing device, including, for example, a personal computer, a PDA, a game device, a cell phone, and a calculator. Processor 140 refers generally to a processing device, including, for example, a microprocessor, an integrated circuit, a programmable logic device, and a device containing a software application. Memory 150 may represent, or include, a variety of non-volatile memory structures, such as, for example, a hard disk, a flash memory, and a compact diskette. Similarly, RAM 160 may represent, or include, a variety of volatile memory structures. Implementations also may use a volatile memory structure, such as RAM 150, in place of memory 160, and/or may use a non-volatile memory structure, such as memory 160, in place of RAM 150, such that, for example, counter 410 and registers 510 and 520 may all be stored in RAM.

Implementations of computer system 100 may use other communication architectures and protocols rather than USB, including, for example, a Peripheral Component Interconnect ("PCI") bus. Other implementations may use different controllers, such as, for example, an Ethernet controller that may count Ethernet packets, and an audio controller that may count audio frames played. More generally, implementations of computer system 100 need not include the components depicted in FIG. 1. In particular, implementations need not use a peripheral bus structure at all. Similarly, operating system 200 need not include a driver, nor an abstraction of a controller or other piece of hardware.

Implementations may include one or more devices configured to perform one or more processes. A device may include, for example, discrete or integrated hardware, firmware, and software. Implementations also may be embodied in a device that includes one or more computer readable media having instructions for carrying out one or more processes. The computer readable media may include, for example, a storage device such as memory 150 and RAM 160, and formatted electromagnetic waves encoding or transmitting instructions. Instructions may be, for example, in hardware, firmware, software, and in an electromagnetic wave. A processor may be, for example, both a device configured to carry out a process and a device including computer readable media having instructions for carrying out a process.

A number of implementations have been described. Nevertheless, it will be understood that various modifications may be made. For example, elements of one or more implementations may be combined, deleted, modified, or supplemented to form further implementations. Accordingly, other implementations are within the scope of the following claims.

What is claimed is:

1. A method comprising:
   accessing data in a first portion of a data structure;
   determining, based on the data accessed from the first portion, an impact on data in a second portion of the data structure arising from an update to data in the first portion; and
   determining, based on the determined impact, whether to lock the data structure during an update to data in the data structure.

2. The method of claim 1 wherein determining whether to lock comprises determining not to lock.

3. The method of claim 2 further comprising:
   accessing source data; and
   updating the data in the first portion of the data structure with the accessed source data.

4. The method of claim 3 wherein the updating of the data in the first portion is performed using an atomic instruction that updates the data in the first portion atomically.

5. The method of claim 3 further comprising determining, before the updating, that the data in the first portion of the data structure has not changed since the determining of the impact was performed.

6. The method of claim 5 wherein a single atomic instruction is used to perform both the determining that the data has not changed and the updating of the data.

7. The method of claim 1 wherein determining whether to lock the data structure comprises determining to lock the data structure.

8. The method of claim 7 further comprising:
   accessing source data; and
   updating the data in the first portion of the data structure with the accessed source data.

9. The method of claim 8 further comprising determining the impact on the data in the second portion of the data structure arising from the updating of the data in the first portion of the data structure.

10. The method of claim 9 further comprising updating the data in the second portion of the data structure based on the determined impact.

11. The method of claim 10 further comprising:
    locking the data structure before updating the data in the first portion of the data structure; and
    unlocking the data structure after updating the data in the second portion of the data structure.

12. The method of claim 8 wherein a size of the source data is the same as a size of the first portion of the data structure.

13. The method of claim 8 wherein a size of the source data is less than a size of the first portion of the data structure.

14. The method of claim 1 wherein a size of the data structure is greater than an atomic size.

15. The method of claim 1 wherein the data structure is a counter and the determined impact comprises a roll-over from less significant bits of the counter to more significant bits of the counter.

16. The method of claim 1 wherein determining the impact comprises determining that there will be no impact on the data in the second portion.

17. An apparatus comprising one or more computer readable media having instructions stored thereon and configured to result in at least the following:
    retrieving data from a first element of a data structure;
    determining, based on the data retrieved from the first element, whether an update to data in the first element might necessitate an update to data in a second element of the data structure; and
    deciding, based on the determination, whether to lock the data structure during an update to data in the data structure.

18. The apparatus of claim 17 wherein the instructions are further configured to result in at least the following:
    accessing source data;
    updating the data in the first element of the data structure with the accessed source data; and
    determining, before the updating, that the data in the first element of the data structure has not changed since the determination was performed,
    wherein:
        a single atomic instruction is used to perform both the determining that the data has not changed and the updating of the data,
        a size of the data structure is greater than an atomic size,
        determining comprises determining that no update to data in the second element will be necessitated, and
        deciding whether to lock comprises deciding not to lock the data structure.

19. An apparatus comprising:
    means for receiving data from a first portion of a data structure;
    means for determining, based on the data received from the first portion, whether an update to data in the first portion might cause a change to data in a second portion of the data structure; and
    means for determining, based on a result of determining whether an update to data in the first portion might cause a change to data in a second portion, whether to lock the data structure during an update to data in the data structure.

20. A method comprising:
accessing data in a low-order portion of a target counter, the target counter also including a high-order portion;
determining, based on the data accessed from the low-order portion, whether an update to the low-order portion could cause a roll-over of the low-order portion into the high-order portion; and
determining, based on the roll-over determination, whether to lock the target counter during an update to data in the target counter.

21. The method of claim 20 wherein:
determining comprises determining that an update to the low-order portion could not cause a roll-over, and
determining whether to lock the target counter comprises determining not to lock the target counter.

22. The method of claim 21 further comprising:
accessing data from a source counter, the source counter having a size that is smaller than a size of the target counter; and
updating the low-order portion of the target counter with the data accessed from the source counter.

23. The method of claim 22 further comprising determining, before the updating, that the data in the low-order portion of the target counter has not changed since the determining to update was performed.

24. The method of claim 23 wherein a single atomic instruction is used to perform both the determining that the data has not changed and the updating of the low-order portion.

25. The method of claim 20 wherein the accessing data, determining whether to update, and determining whether to lock are performed repeatedly in response to a timed event.

26. An apparatus comprising one or more computer readable media having instructions stored thereon and configured to result in at least the following:
receiving data in a low-order portion of a target counter, the target counter also including a high-order portion;
determining, based on the data received from the low-order portion, that an update to the low-order portion could not cause a roll-over of the low-order portion into the high-order portion;
deciding, based on the no-roll-over determination, not to lock the target counter during an update to data in the target counter;
accessing data from a source counter, the source counter having a size that is smaller than a size of the target counter;
determining that the data in the low-order portion of the target counter has not changed since the no roll-over determination; and
updating, after determining that the data in the low-order portion has not changed, the low-order portion of the target counter with the data accessed from the source counter,
wherein the determining that the data has not changed and the updating of the low-order portion are performed using a single atomic instruction.

27. A method comprising:
accessing data in a first portion of a source data structure;
determining, based on the data accessed from the first portion of the source data structure, whether data in a second portion of the source data structure may have changed since a previous access of the data in the first portion of the source data structure; and
determining, based on the determination of whether the data in the second portion has changed, whether to lock a target data structure while storing all or part of data from the source data structure into the target data structure.

28. The method of claim 27 wherein determining whether data in a second portion has changed comprises:
comparing the data accessed from the first portion to one or more stored values, the one or more stored values being used to differentiate data in the first portion that has no supporting data stored in the second portion from data in the first portion that does have supporting data stored in the second portion, and
determining whether data in the second portion has changed based on a result of the comparing.

29. The method of claim 27 wherein determining whether data in a second portion has changed comprises determining that data in the second portion has changed, and the method further comprises:
storing the data in the first portion of the source data structure into a first portion of the target data structure; and
storing the data in the second portion of the source data structure into a second portion of the target data structure.

30. The method of claim 27 wherein:
the target data structure comprises a first portion and a second portion, and
a combined size of the first portion of the target data structure and the second portion of the target data structure exceeds an atomic size, and
a size of the first portion of the target data structure does not exceed the atomic size.

* * * * *